(12) United States Patent
Strahan (10) Patent No.: US 12,420,371 B2
(45) Date of Patent: Sep. 23, 2025

(54) DUST CONTAINMENT ASSEMBLY

(71) Applicant: Eric Strahan, Watertown, TN (US)

(72) Inventor: Eric Strahan, Watertown, TN (US)

( * ) Notice: Subject to any disclaimer, the term of this patent is extended or adjusted under 35 U.S.C. 154(b) by 968 days.

(21) Appl. No.: 17/537,636

(22) Filed: Nov. 30, 2021

(65) Prior Publication Data
US 2023/0166374 A1 Jun. 1, 2023

(51) Int. Cl.
*B23Q 11/00* (2006.01)
*B08B 15/02* (2006.01)

(52) U.S. Cl.
CPC ........ *B23Q 11/0067* (2013.01); *B08B 15/026* (2013.01); *B23Q 11/0046* (2013.01)

(58) Field of Classification Search
CPC . B23Q 11/02; B23Q 11/0042; B23Q 11/0046; B23Q 11/0053; B23Q 11/0067; B23Q 11/0071; B08B 3/006; B08B 5/00; B08B 5/04; B08B 15/026; B08B 15/04; B23D 59/006; B23D 47/025; A47L 7/0019; A47L 7/0095; A47L 9/1683; A47B 9/20; A47B 47/045; A47B 2200/0051; A47B 2200/0055; B25J 21/02; B01L 1/04; A45D 2200/1018; F16B 7/10
USPC ............. 321/1, 229; 108/147.19; 312/1, 229
See application file for complete search history.

(56) References Cited

U.S. PATENT DOCUMENTS

| | | | | |
|---|---|---|---|---|
| 3,410,619 | A * | 11/1968 | Delnay | ..... B25J 21/02 312/1 |
| 4,780,927 | A * | 11/1988 | Clayton | ..... B60T 17/221 15/345 |
| 9,682,496 | B2 | 6/2017 | Fairweather | |
| 10,343,293 | B1 * | 7/2019 | Taylor | ..... B08B 15/026 |
| 11,241,087 | B2 * | 2/2022 | Choi | ..... A47B 83/024 |
| 2002/0148394 | A1 * | 10/2002 | Strong | ..... A47B 9/14 108/147.19 |
| 2004/0120607 | A1 | 6/2004 | Goren | |
| 2004/0141820 | A1 | 7/2004 | Mikon | |
| 2010/0269353 | A1 | 10/2010 | Martin | |
| 2012/0247294 | A1 | 10/2012 | Martin | |

FOREIGN PATENT DOCUMENTS

WO WO2012099509 7/2012

* cited by examiner

*Primary Examiner* — Daniel J Troy
*Assistant Examiner* — Elizabeth Irene Artalejo (57) ABSTRACT

A dust containment assembly includes a box that has an open side which can be placed against a gypsum wall panel. The box has a pair of hand openings extending through the box to facilitate a user to access the area of gypsum wall panel that is covered by the box. The box is comprised of a fluid impermeable material to inhibit dust from escaping the box. A pair of sleeves is each coupled to the box and each of the sleeves is aligned with a respective one of the hand openings. Each of the sleeves can insertably receive a respective one of the user's arms for the user to work on the area of the gypsum wall panel that is covered by the box. A plurality of legs is each movably disposed on the box to retain the box at a desired height on the gypsum wall panel.

10 Claims, 8 Drawing Sheets

DUST CONTAINMENT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to containment devices and more particularly pertains to a new containment device for containing dust produced from cutting gypsum wall board. The device includes a translucent box which has an open end that can be positioned against a gypsum wall board. The box has a pair of hand openings extending through the box to accommodate each of a user's arms. The device includes a pair of sleeves that are each coupled to the box and which are each aligned with a respective hand opening. In this way the user can extend their hands through each of the sleeves to cut the gypsum wall board while inhibiting dust from escaping the box.

(2) Description of Related Art Including Information Disclosed Under 37 CFR 1.97 and 1.98

The prior art relates to containment devices including a dust collection box that is integrated into an electric chop saw. The prior art discloses a variety of dust collection devices that are integrated into an electric saw. The prior art discloses a dust collection basin that is shaped like a bowl.

BRIEF SUMMARY OF THE INVENTION

An embodiment of the disclosure meets the needs presented above by generally comprising a box that has an open side which can be placed against a gypsum wall panel. The box has a pair of hand openings each extending through the box to facilitate a user to access the area of gypsum wall panel that is covered by the box. The box is comprised of a fluid impermeable material to inhibit dust from escaping the box. A pair of sleeves is each coupled to the box and each of the sleeves is aligned with a respective one of the hand openings. In this way each of the sleeves can insertably receive a respective one of the user's arms thereby facilitating the user to work on the area of the gypsum wall panel that is covered by the box. A plurality of legs is each movably disposed on the box to retain the box at a desired height on the gypsum wall panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
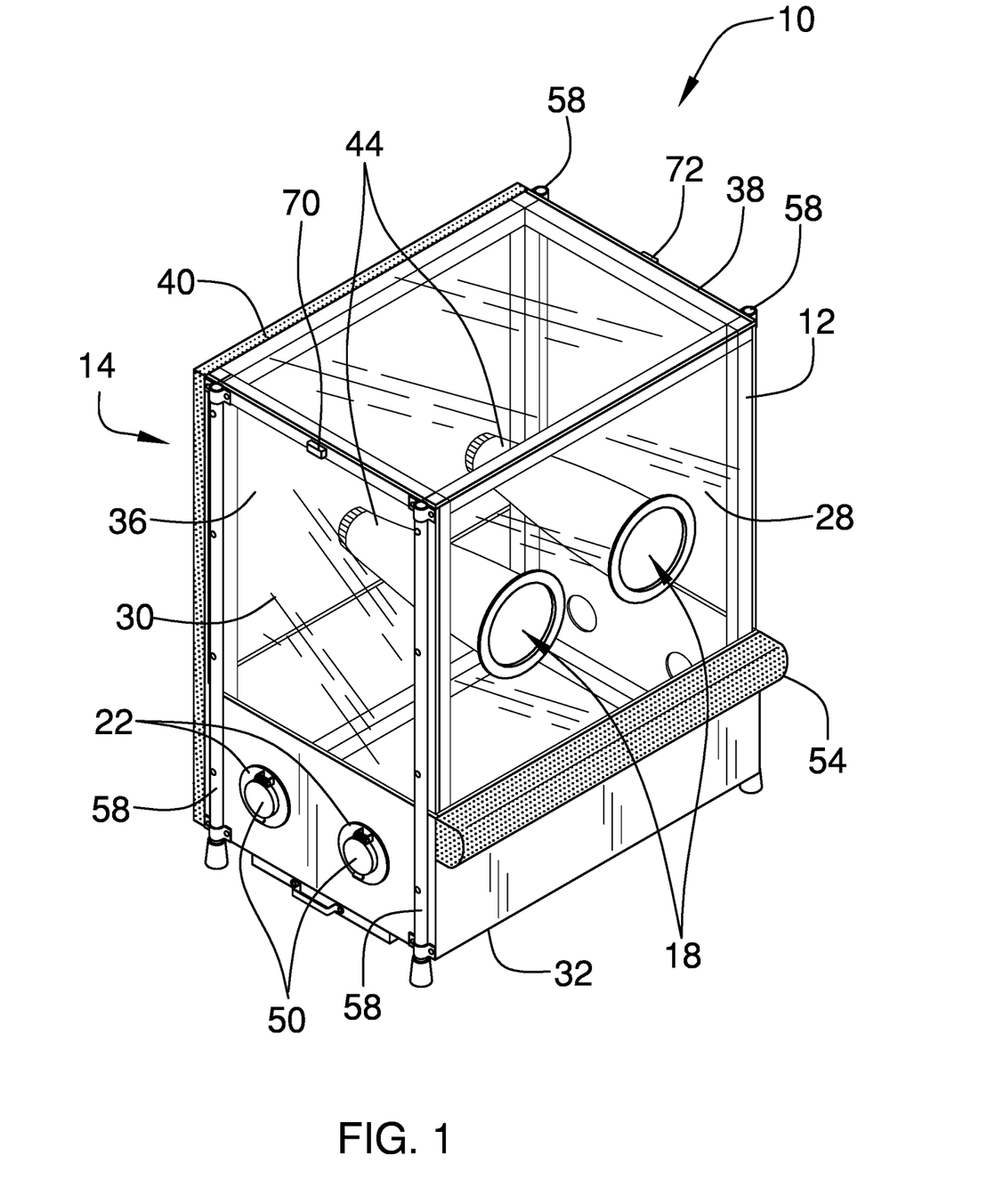
FIG. 1 is a front perspective view of a dust containment assembly according to an embodiment of the disclosure.
Figure 2:
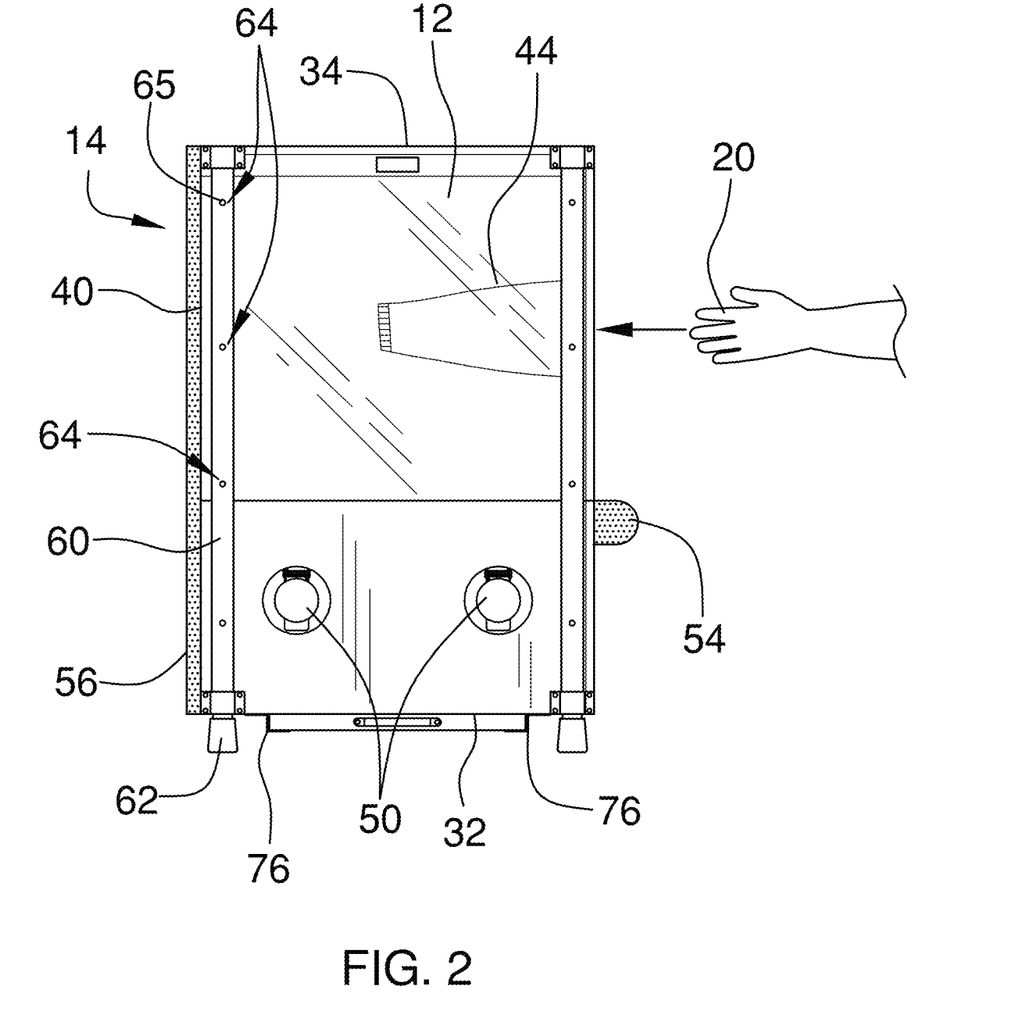
FIG. 2 is a left side view of an embodiment of the disclosure.
Figure 3:
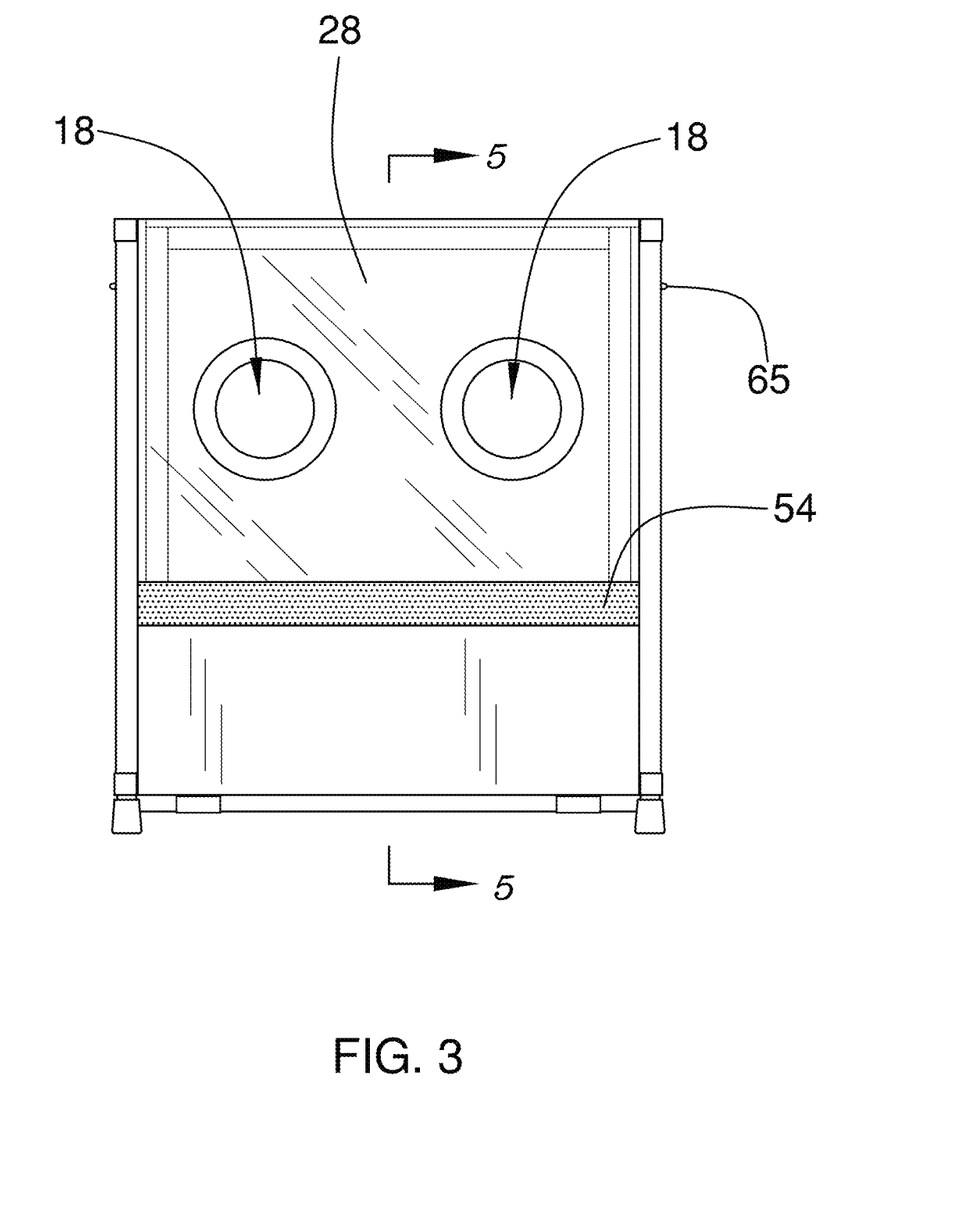
FIG. 3 is a front view of an embodiment of the disclosure.
Figure 4:
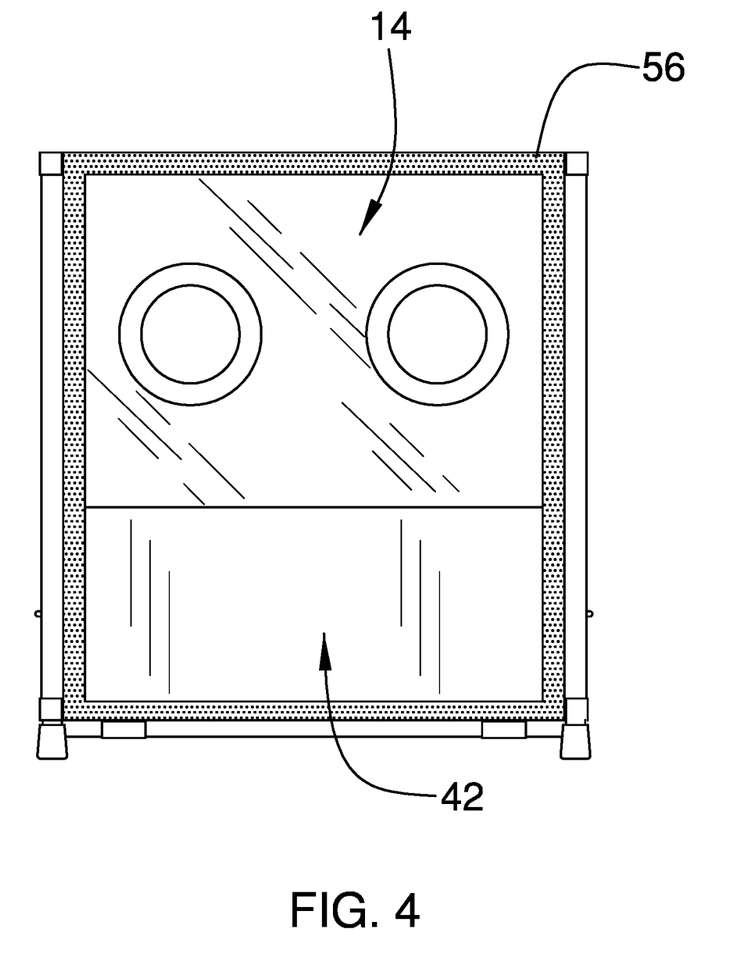
FIG. 4 is a back view of an embodiment of the disclosure.
Figure 5:
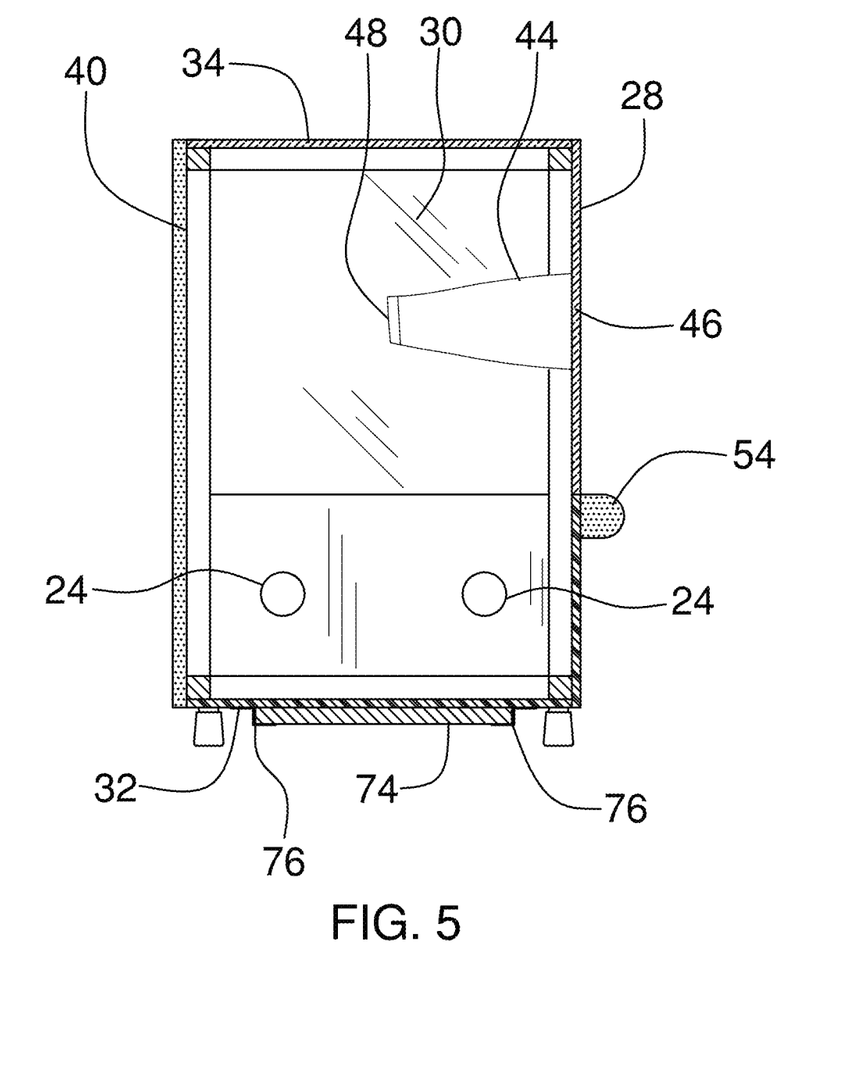
FIG. 5 is a cross sectional view taken along line 5-5 of FIG. 3 of an embodiment of the disclosure.
Figure 6:
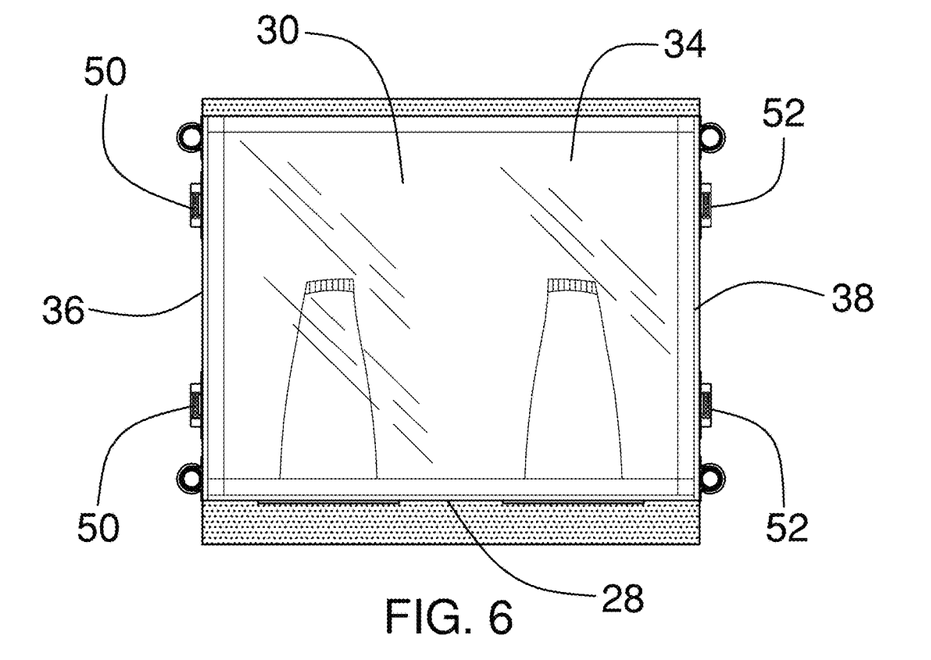
FIG. 6 is a top view of an embodiment of the disclosure.
Figure 7:
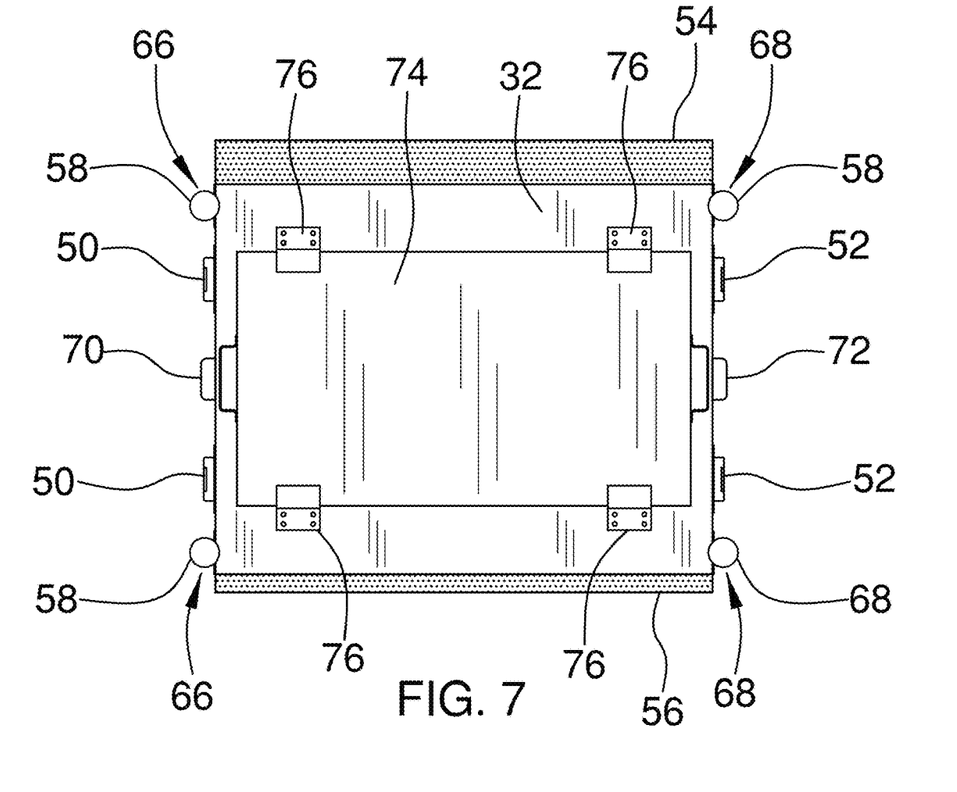
FIG. 7 is a bottom view of an embodiment of the disclosure.
Figure 8:
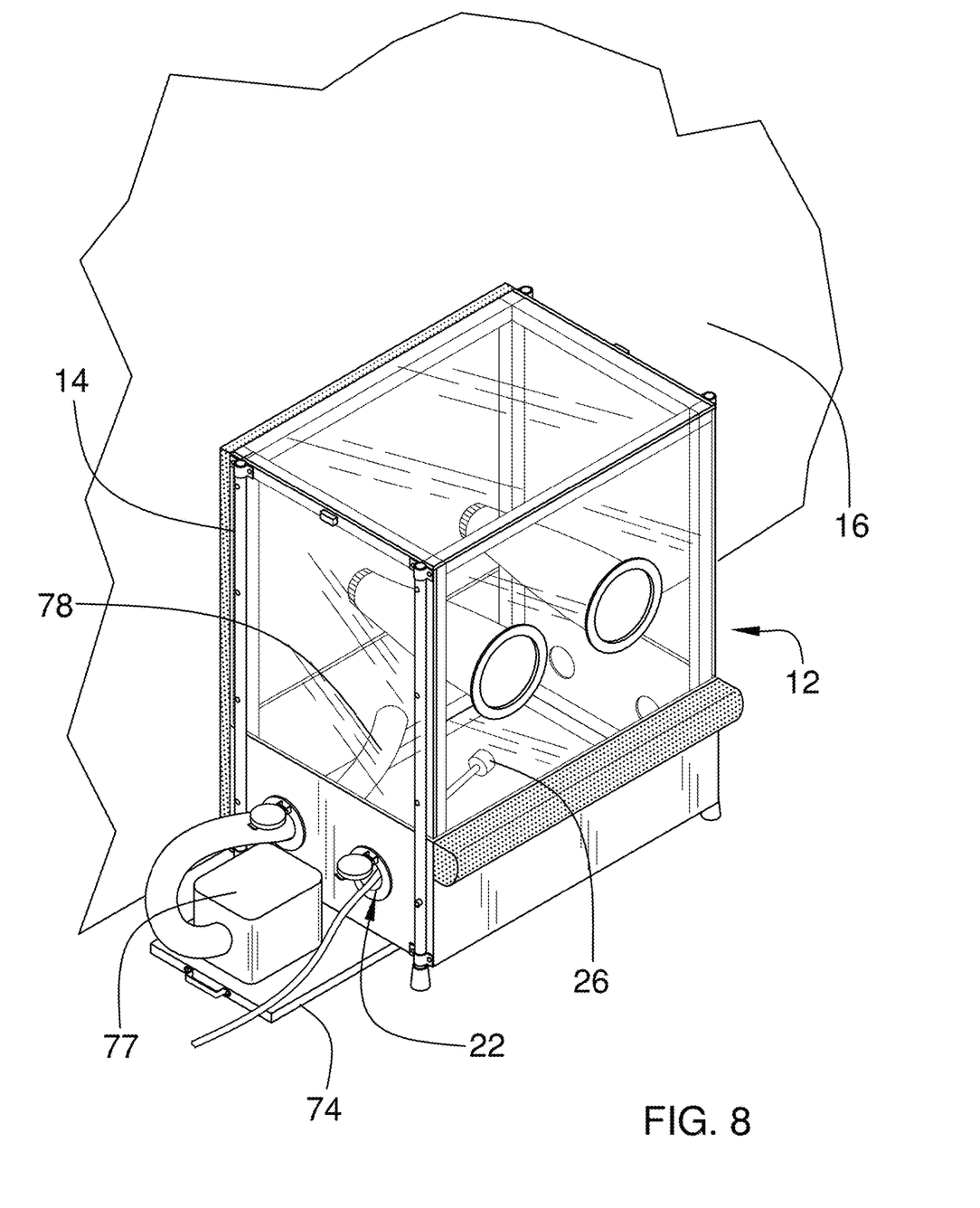
FIG. 8 is a perspective in-use view of an embodiment of the disclosure.
Figure 9:
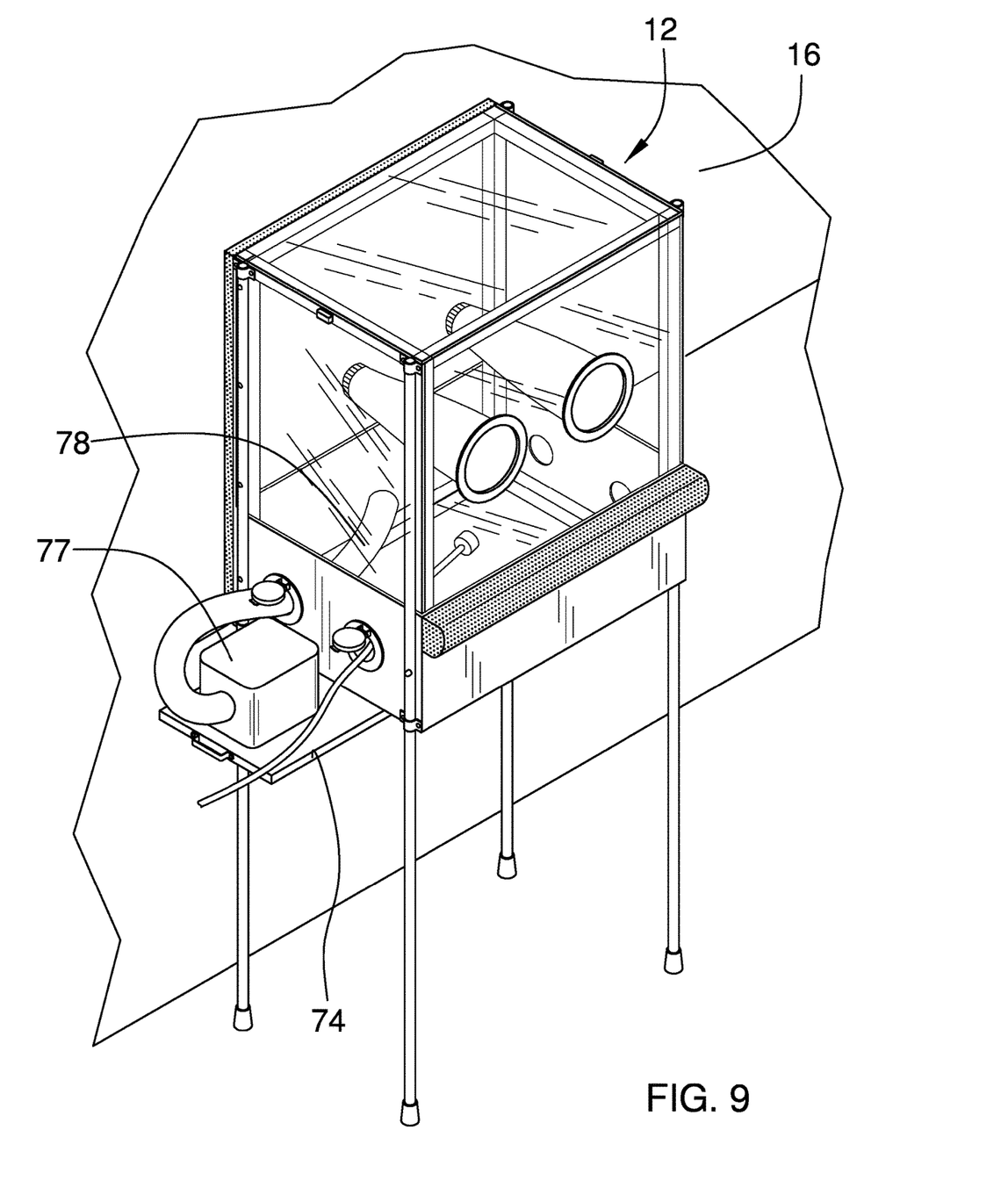
FIG. 9 is a perspective in-use view of an embodiment of the disclosure showing a plurality of legs being elongated.

With reference now to the drawings, and in particular to FIGS. 1 through 9 thereof, a new containment device embodying the principles and concepts of an embodiment of the disclosure and generally designated by the reference numeral 10 will be described.

As best illustrated in FIGS. 1 through 9, the dust containment assembly 10 generally comprises a box 12 that has an open side 14 such that the open side 14 can be placed against a gypsum wall panel 16. The box 12 has a pair of hand openings 18 each extending through the box 12 for insertably receiving a respective one of a user's hands 20. In this way the user can access the area of gypsum wall panel 16 that is covered by the box 12. The box 12 has a set of first holes 22 each extending into the box 12 to have accessory tools 26 extended through the first holes 22. The box 12 has a set of second holes 24 each extending into the box 12 to have accessory tools 26 extended through the second holes 24. Furthermore, the set of first holes 22 is positioned on an opposite side of the box 12 from the set of second holes 24 to accommodate left handed users and right handed users.

The box 12 has a front wall 28 and an outer wall 30 extending away from the front wall 28, and the outer wall 30 has a bottom side 32, a top side 34, a first lateral side 36, a second lateral side 38 and a distal edge 40 with respect to the front wall 28 defining a primary opening 42 into the box 12. Each of the hand openings 18 extends through the front wall 28, and the hand openings 18 are spaced apart from each other and are distributed along a line extending between the first lateral side 36 and the second lateral side 38. Each of the first holes 22 extends through the first lateral side 36, and the first holes 22 are spaced apart from each other and are distributed along an axis extending between the distal edge 40 of the outer wall 30 and the front wall 28. Each of the second holes 24 extends through the second lateral side 38, and the second holes 24 are spaced apart from each other and are distributed along an axis extending between the distal edge 40 of the outer wall 30 and the front wall 28. The box 12 is comprised of a translucent material to facilitate the user to see the area of the gypsum wall panel 16 that is covered by the box 12. Additionally, the box 12 is comprised of a fluid impermeable material to inhibit dust from passing through the box 12.

A pair of sleeves 44 is each coupled to the box 12 having the sleeves 44 being positioned within the box 12. Each of the sleeves 44 is aligned with a respective one of the hand openings 18 to insertably receive a respective one of the user's arms. In this way the user can work on the area of the gypsum wall panel 16 that is covered by the box 12. Each of the sleeves 44 is comprised of a fluid impermeable material to inhibit dust from passing through the hand openings 18 when the user's arms are extended through the sleeves 44. Each of the sleeves 44 has a first end 46 and a second end 48, and the first end 46 of each of the sleeves 44 is coupled to an inside surface of the front wall 28 having each of the sleeves 44 surrounding the respective hand opening 18. Each of the sleeves 44 tapers between the first end 46 and the second end 48, and the second end 48 of each of the sleeves 44 is comprised of a resiliently stretchable material to compress around the user's arms.

A pair of first caps 50 is each hingedly disposed on the first lateral side 36 of the outer wall 30 of the box 12, and each of the first caps 50 is aligned with a respective one of the first holes 22. Each of the first caps 50 is positionable in a closed position having the respective first hole being covered. Conversely each of the first caps 50 is positionable in an open position having the respective first hole 22 being exposed. A pair of second caps 52 is each hingedly disposed on the second lateral side 38 of the outer wall 30 of the box 12 and each of the second caps 52 is aligned with a respective one of the second holes 24. Each of the second caps 52 is positionable in a closed position has the respective second hole 24 being covered. Conversely, each of the second caps 52 is positionable in an open position having the respective second hole 24 being exposed.

A front pad 54 is coupled to the box 12 to facilitate the user to lean against the pad for securing the box 12 against the gypsum wall panel 16. The front pad 54 is positioned on the front wall 28 of the box 12 and the front pad 54 extends between the first lateral side 36 and the second lateral side 38 of the outer wall 30. Additionally, the front pad 54 is positioned proximate the bottom side 32 of the outer wall 30. A back pad 56 is coupled to the box 12 and the back pad 56 surrounds the open side 14 of the box 12. In this way the back pad 56 is compressed against the gypsum wall panel 16 to inhibit dust from passing between the box 12 and the gypsum wall panel 16. The back pad 56 is positioned on the distal edge 40 of the outer wall 30 of the box 12 and the back pad 56 extends around a full perimeter of the distal edge 40.

A plurality of legs 58 is each movably disposed on the box 12 and each of the legs 58 has a telescopically adjustable length to retain the box 12 at a desired height on the gypsum wall panel 16. Each of the legs 58 comprises a first portion 60 that slidably receives a second portion 62, and the first portion 60 of each of the legs 58 is vertically oriented on a respective one of the first lateral side 36 and the second lateral side 38 of the outer wall 30 of the box 12. Furthermore, each of the legs 58 is positioned adjacent to a respective one of the distal edge 40 of the outer wall 30 and the front wall 28. The second portion 62 of each of the legs 58 extends downwardly from the bottom side 32 of the outer wall 30. Additionally, the second portion 62 of each of the legs 58 has a bottom end which rests on a support surface.

The first portion 60 of each of the legs 58 has a plurality of engagement points 64 that are vertically distributed on the first portion 60. The second portion 62 of each of the legs 58 has a lock 65 that releasably engages a respective one of the engagement points 64 on the first portion 60 for retaining each of the legs 58 at a desired length. The plurality of legs 58 includes a set of first legs 66 and a set of second legs 68. Each of the first legs 66 is positioned on the first lateral side 36 of the outer wall 30 of the box 12, and each of the second legs 68 is positioned on the second lateral side 38 of the outer wall 30 of the box 12.

The lock 65 associated with each of the first legs 66 includes a first button 70 which is disposed on the first lateral side 36 of the outer wall 30 of the box 12. The first button 70 is in mechanical communication with the lock 65 associated with each of the first legs 66. Furthermore, the lock 65 associated with each of the first legs 66 is urged into a disengaged condition to facilitate the second portion 62 of the first legs 66 to be adjusted. The lock 65 associated with each of the second legs 68 includes a second button 72 that is disposed on the second lateral side 38 of the outer wall 30 of the box 12. The second button 72 is in mechanical communication with the lock 65 associated with each of the second legs 68. Additionally, the lock 65 associated with each of the second legs 68 is urged into a disengaged condition to facilitate the second portion 62 of the second legs 68 to be adjusted.

A tray 74 is slidably coupled to the bottom side 32 of the outer wall 30 of the box 12. The tray 74 is positionable in a deployed position having the tray 74 extending laterally away from the outer wall 30 of the box 12 to support a vacuum 77 or other object that user might wish to employ. The tray 74 is positionable in a stored position having the tray 74 being positioned beneath the bottom side 32 of the outer wall 30. A plurality of tracks 76 is each disposed on the bottom side 32 of the outer wall 30 of the box 12. The tray 74 slidably engages each of the tracks 76. Additionally, each of the tracks 76 extends between the first lateral side 36 and the second lateral side 38 of the outer wall 30. In this way the tray 74 can be extended outwardly beyond either the first lateral side 36 or the second lateral side 38.

In use, each of the legs 58 is adjusted to a selected length and the box 12 is positioned against the gypsum wall panel 16 such that the back pad 56 abuts the gypsum wall panel 16. Additionally, the box 12 is aligned with a location on the gypsum wall panel 16 that is to be cut or drilled. The user inserts each of their hands 20 through a respective sleeve 44 to facilitate the user to cut or drill the gypsum wall panel 16 that is surrounded by the box 12. In this way the box 12 contains dust the is produced when gypsum panel 16 is cut or drilled. Thus, the gypsum wall panel 16 can be cut or drilled in a hospital, for example, or other location that requires air to be dust free. Additionally, the tray 74 can be slid into the deployed position to support the vacuum 77 and a hose 78 of the vacuum 77 can be extended through a respective one of the first holes 22 or the second holes 24 for removing the dust that collects in the box 12. Additionally, each of first holes 22 and second holes 24 can accommodate a power cord for a power tool, for example, that is being employed inside of the box 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A dust containment assembly for containing dust from cutting gypsum wall panels, said assembly comprising:
    a box having an open side wherein said open side is configured to be placed against a gypsum wall panel, said box having a pair of hand openings each extending through said box wherein each of said hand openings is configured to have a respective one of a user's hands extended through said hand openings thereby facilitating the user to access the area of gypsum wall panel that is covered by said box, said box having a set of first holes each extending into said box wherein each of said first holes is configured to have accessory tools extended through said first holes, said box having a set of second holes each extending into said box wherein each of said second holes is configured to have accessory tools extended through said second holes, said set of first holes being positioned on an opposite side of said box from said set of second holes wherein said first holes and said second holes is configured to accommodate left handed users and right handed users, said box being comprised of a fluid impermeable material wherein said box is configured to inhibit dust from escaping said box;
    a pair of sleeves, each of said sleeves being coupled to said box having said sleeves being positioned within said box, each of said sleeves being aligned with a respective one of said hand openings wherein each of said sleeves is configured to insertably receive a respective one of the user's arms thereby facilitating the user to work on the area of the gypsum wall panel that is covered by said box;
    a front pad being coupled to said box wherein said front pad is configured to facilitate the user to lean a torso of the user against said pad for securing said box against the gypsum wall panel;
    a back pad being coupled to said box, said back pad surrounding said open side of said box wherein said back pad is configured to be compressed against the gypsum wall panel to inhibit dust from passing between said box and the gypsum wall panel; and
    a plurality of legs, each of said legs being movably disposed on said box, each of said legs having a telescopically adjustable length wherein said plurality of legs is configured to retain said box at a desired height on the gypsum wall panel.

2. The assembly according to claim 1, wherein:
    said box has a front wall and an outer wall extending away from said front wall, said outer wall having a bottom side, a top side, a first lateral side, a second lateral side and a distal edge with respect to said front wall defining a primary opening into said box;
    each of said hand openings extends through said front wall, said hand openings being spaced apart from each other and being distributed along a line extending between said first lateral side and said second lateral side;
    each of said first holes extends through said first lateral side, said first holes being spaced apart from each other and being distributed along an axis extending between said distal edge of said outer wall and said front wall;
    each of said second holes extends through said second lateral side, said second holes being spaced apart from each other and being distributed along an axis extending between said distal edge of said outer wall and said front wall; and
    said box is comprised of a translucent material wherein said box is configured to facilitate the user to see the area of the gypsum wall panel that is covered by said box.

3. The assembly according to claim 2, wherein:
    each of said sleeves is comprised of a fluid impermeable material wherein each of said sleeves is configured to inhibit dust from passing through said hand openings when the user's arms are extended through said sleeves; and
    each of said sleeves has a first end and a second end, said first end of each of said sleeves being coupled to an inside surface of said front wall having each of said sleeves surrounding said respective hand opening, each of said sleeves tapering between said first end and said second end, said second end of each of said sleeves being comprised of a resiliently stretchable material wherein said second end of each of said sleeves is configured to compress around the user's arms.

4. The assembly according to claim 2, further comprising a pair of first caps, each of said first caps being hingedly disposed on said first lateral side of said outer wall of said box, each of said first caps being aligned with a respective one of said first holes, each of said first caps being positionable in a closed position having said respective first hole being covered, each of said first caps being positionable in an open position having said respective first hole being exposed.

5. The assembly according to claim 4, further comprising a pair of second caps, each of said second caps being hingedly disposed on said second lateral side of said outer wall of said box, each of said second caps being aligned with a respective one of said second holes, each of said second caps being positionable in a closed position having said respective second hole being covered, each of said second caps being positionable in an open position having said respective second hole being exposed.

6. The assembly according to claim 2, wherein:
said front pad is positioned on said front wall of said box, said front pad extending between said first lateral side and said second lateral side of said outer wall, said front pad being positioned proximate said bottom side of said outer wall; and
said back pad is positioned on said distal edge of said outer wall of said box, said back pad extending around a full perimeter of said distal edge.

7. The assembly according to claim 2, wherein each of said legs comprises a first portion slidably receiving a second portion, said first portion of each of said legs being vertically oriented on a respective one of said first lateral side and said second lateral side of said outer wall of said box, each of said legs being positioned adjacent to a respective one of said distal edge of said outer wall and said front wall, said second portion of each of said legs extending downwardly from said bottom side of said outer wall, said second portion of each of said legs having a bottom end wherein said bottom end is configured to rest on a support surface.

8. The assembly according to claim 7, wherein said first portion of each of said legs has a plurality of engagement points being vertically distributed on said first portion, said second portion of each of said legs having a lock releasably engaging a respective one of said engagement points on said first portion for retaining each of said legs at a desired length.

9. The assembly according to claim 8, wherein:
said plurality of legs includes a set of first legs and a set of second legs, each of said first legs being positioned on said first lateral side of said outer wall of said box, each of said second legs being positioned on said second lateral side of said outer wall of said box;
said lock associated with each of said first legs being configured to be urged into a disengaged condition to facilitate said second portion of said first legs to be adjusted; and
said lock associated with each of said second legs being configured to be urged into a disengaged condition to facilitate said second portion of said second legs to be adjusted.

10. A dust containment assembly for containing dust from cutting gypsum wall panels, said assembly comprising:
a box having an open side wherein said open side is configured to be placed against a gypsum wall panel, said box having a pair of hand openings each extending through said box wherein each of said hand openings is configured to have a respective one of a user's hands extended through said hand openings thereby facilitating the user to access the area of gypsum wall panel that is covered by said box, said box having a set of first holes each extending into said box wherein each of said first holes is configured to have accessory tools extended through said first holes, said box having a set of second holes each extending into said box wherein each of said second holes is configured to have accessory tools extended through said second holes, said set of first holes being positioned on an opposite side of said box from said set of second holes wherein said first holes and said second holes is configured to accommodate left handed users and right handed users, said box having a front wall and an outer wall extending away from said front wall, said outer wall having a bottom side, a top side, a first lateral side, a second lateral side and a distal edge with respect to said front wall defining a primary opening into said box, each of said hand openings extending through said front wall, said hand openings being spaced apart from each other and being distributed along a line extending between said first lateral side and said second lateral side, each of said first holes extending through said first lateral side, said first holes being spaced apart from each other and being distributed along an axis extending between said distal edge of said outer wall and said front wall, each of said second holes extending through said second lateral side, said second holes being spaced apart from each other and being distributed along an axis extending between said distal edge of said outer wall and said front wall, said box being comprised of a translucent material wherein said box is configured to facilitate the user to see the area of the gypsum wall panel that is covered by said box, said box being comprised of a fluid impermeable material wherein said box is configured to inhibit dust from escaping said box;
a pair of sleeves, each of said sleeves being coupled to said box having said sleeves being positioned within said box, each of said sleeves being aligned with a respective one of said hand openings wherein each of said sleeves is configured to insertably receive a respective one of the user's arms thereby facilitating the user to work on the area of the gypsum wall panel that is covered by said box, each of said sleeves being comprised of a fluid impermeable material wherein each of said sleeves is configured to inhibit dust from passing through said hand openings when the user's arms are extended through said sleeves, each of said sleeves having a first end and a second end, said first end of each of said sleeves being coupled to an inside surface of said front wall having each of said sleeves surrounding said respective hand opening, each of said sleeves tapering between said first end and said second end, said second end of each of said sleeves being comprised of a resiliently stretchable material wherein said second end of each of said sleeves is configured to compress around the user's arms;
a pair of first caps, each of said first caps being hingedly disposed on said first lateral side of said outer wall of said box, each of said first caps being aligned with a respective one of said first holes, each of said first caps being positionable in a closed position having said respective first hole being covered, each of said first caps being positionable in an open position having said respective first hole being exposed;
a pair of second caps, each of said second caps being hingedly disposed on said second lateral side of said outer wall of said box, each of said second caps being aligned with a respective one of said second holes, each of said second caps being positionable in a closed position having said respective second hole being covered, each of said second caps being positionable in an open position having said respective second hole being exposed;
a front pad being coupled to said box wherein said front pad is configured to facilitate the user to lean a torso of the user against said pad for securing said box against the gypsum wall panel, said front pad being positioned on said front wall of said box, said front pad extending between said first lateral side and said second lateral side of said outer wall, said front pad being positioned proximate said bottom side of said outer wall;

a back pad being coupled to said box, said back pad surrounding said open side of said box wherein said back pad is configured to be compressed against the gypsum wall panel to inhibit dust from passing between said box and the gypsum wall panel, said back pad being positioned on said distal edge of said outer wall of said box, said back pad extending around a full perimeter of said distal edge;

a plurality of legs, each of said legs being movably disposed on said box, each of said legs having a telescopically adjustable length wherein said plurality of legs is configured to retain said box at a desired height on the gypsum wall panel, each of said legs comprising a first portion slidably receiving a second portion, said first portion of each of said legs being vertically oriented on a respective one of said first lateral side and said second lateral side of said outer wall of said box, each of said legs being positioned adjacent to a respective one of said distal edge of said outer wall and said front wall, said second portion of each of said legs extending downwardly from said bottom side of said outer wall, said second portion of each of said legs having a bottom end wherein said bottom end is configured to rest on a support surface, said first portion of each of said legs having a plurality of engagement points being vertically distributed on said first portion, said second portion of each of said legs having a lock releasably engaging a respective one of said engagement points on said first portion for retaining each of said legs at a desired length, said plurality of legs including a set of first legs and a set of second legs, each of said first legs being positioned on said first lateral side of said outer wall of said box, each of said second legs being positioned on said second lateral side of said outer wall of said box, said lock associated with each of said first legs being configured to be urged into a disengaged condition to facilitate said second portion of said first legs to be adjusted, said lock associated with each of said second legs being configured to be urged into a disengaged condition to facilitate said second portion of said second legs to be adjusted; and a tray being slidably coupled to said bottom side of said outer wall of said box, said tray being positionable in a deployed position having said tray extending laterally away from said outer wall of said box wherein said tray is configured to support a vacuum, said tray being positionable in a stored position having said tray being positioned beneath said bottom side of said outer wall.

\* \* \* \* \*